INVENTOR.
LARRY F. SMREKAR

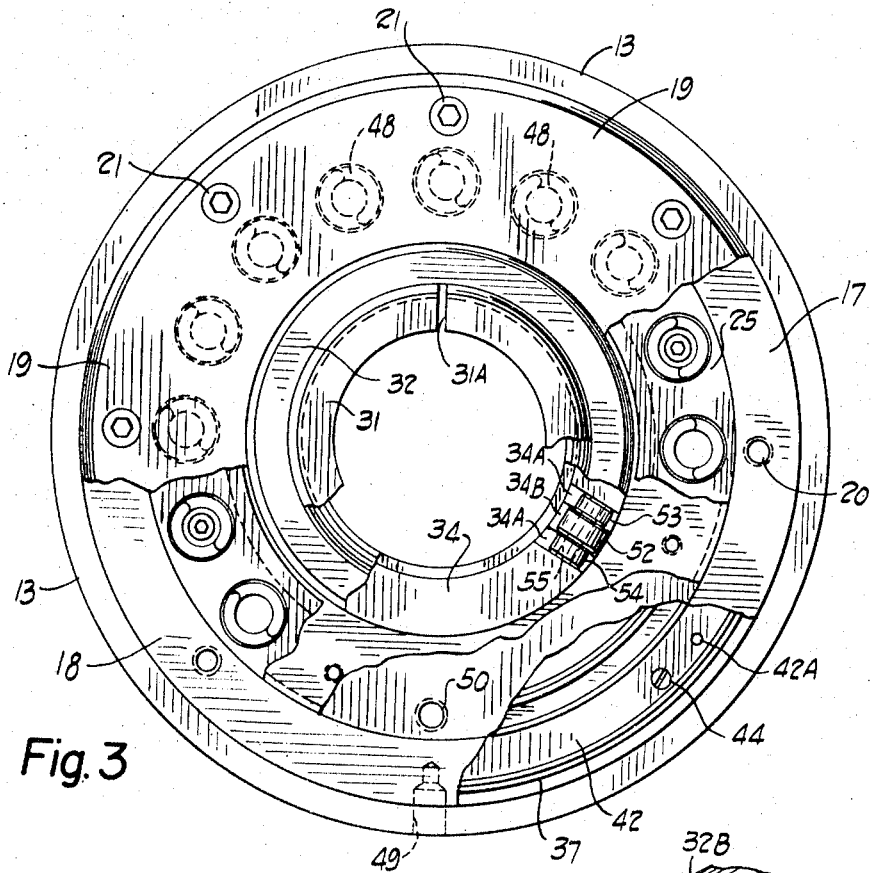
Fig. 3
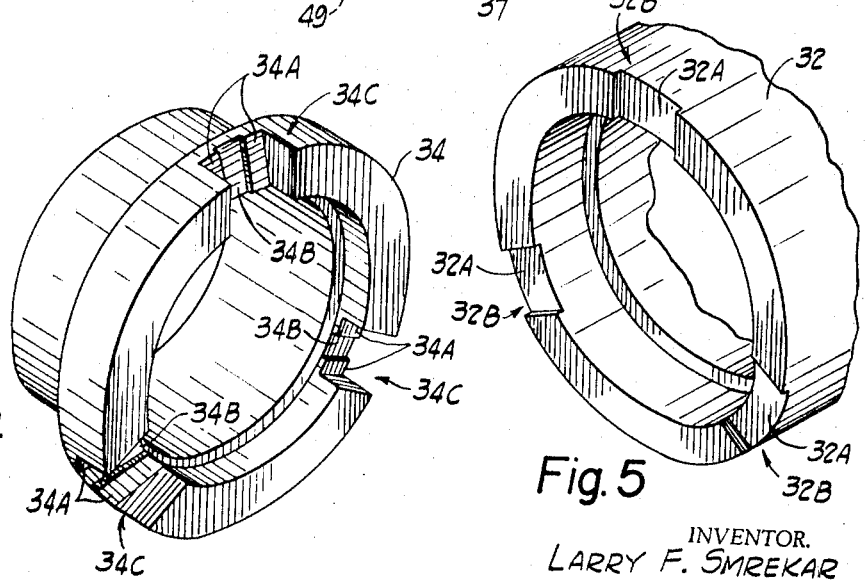
Fig. 4
Fig. 5
INVENTOR.
LARRY F. SMREKAR
ATTORNEYS.

United States Patent Office 3,451,314
Patented June 24, 1969

3,451,314
COLLET MECHANISM
Larry F. Smrekar, 6604 Solon Road,
Solon, Ohio 44139
Original application Sept. 8, 1966, Ser. No. 578,016.
Divided and this application July 16, 1968, Ser.
No. 745,237
Int. Cl. F15b 13/04, 11/08; B23b 31/30
U.S. Cl. 91—422                                    4 Claims

ABSTRACT OF THE DISCLOSURE

Valve mechanism for controlling the flow of fluid to a rotatable actuatable device such as a collet, having a toroidal piston movable axially in an nnular groove of a gland member carried by a nonrotatable part, a sealing member carried by the toroidal piston, inlet means in the gland member for supplying fluid under pressure to the groove back of the toroidal piston, a conduit from the face of the rotatable actuatable device directed toward the toroidal piston to conduct fluid under pressure to the rotatable actuatable device for actuating the same, a check valve controlled device in the sealing member and toroidal piston to permit fluid under pressure to flow from the groove into the conduit only after the sealing member has sealingly engaged the said face of the rotatable actuatable device.

---

This application is a division of my application Ser. No. 578,016, filed in the United States Patent Office on Sept. 8, 1966.

My invention relates to collet mechanisms such as used on lathes, screw machines and other machines requiring chucking of stock.

My invention is directed to a novel collect mechanism wherein the force utilized for actuating the collet to a holding or chucking position is obtained by resilient means augmented by mechanical-advantage means, and more particularly wherein the force of springs is utilized and the force of the springs is increased by a wedging action obtained through camming means and roller means.

An object of my invention is to obtain a strong and efficient chucking action in a collect mechanism, and which action is readily and quickly released by fluid pressure means such as obtained by a pneumatic piston and cylinder assembly.

Another object is the provision for greatly augmenting the force imposed by springs in a collet mechanism for actuating the sleeve that cooperates with the collet providing the chucking action.

Another object is the provision for combining resilient means, camming means and fluid pressure means in a unique combination for obtaining superior results and a novel manner of actuating a collet mechanism.

Other objects and a fuller understanding of this invention may be had by referring to the following description and claims, taken in conjunction with the accompanying drawings, in which:

FIGURE 3 is an end view, on a reduced scale, looking toward the left of the mechanism shown in FIGURES 1 and 2, that is toward the face of the collect mechanism;

FIGURE 4 is an enlarged perspective view of a ring member embodied in my collet mechanism and showing some of the wedge surfaces utilized; and FIGURE 5 is a perspective view of the end portion of the collet-actuating sleeve and showing other of the wedging surfaces.

Figure 1:
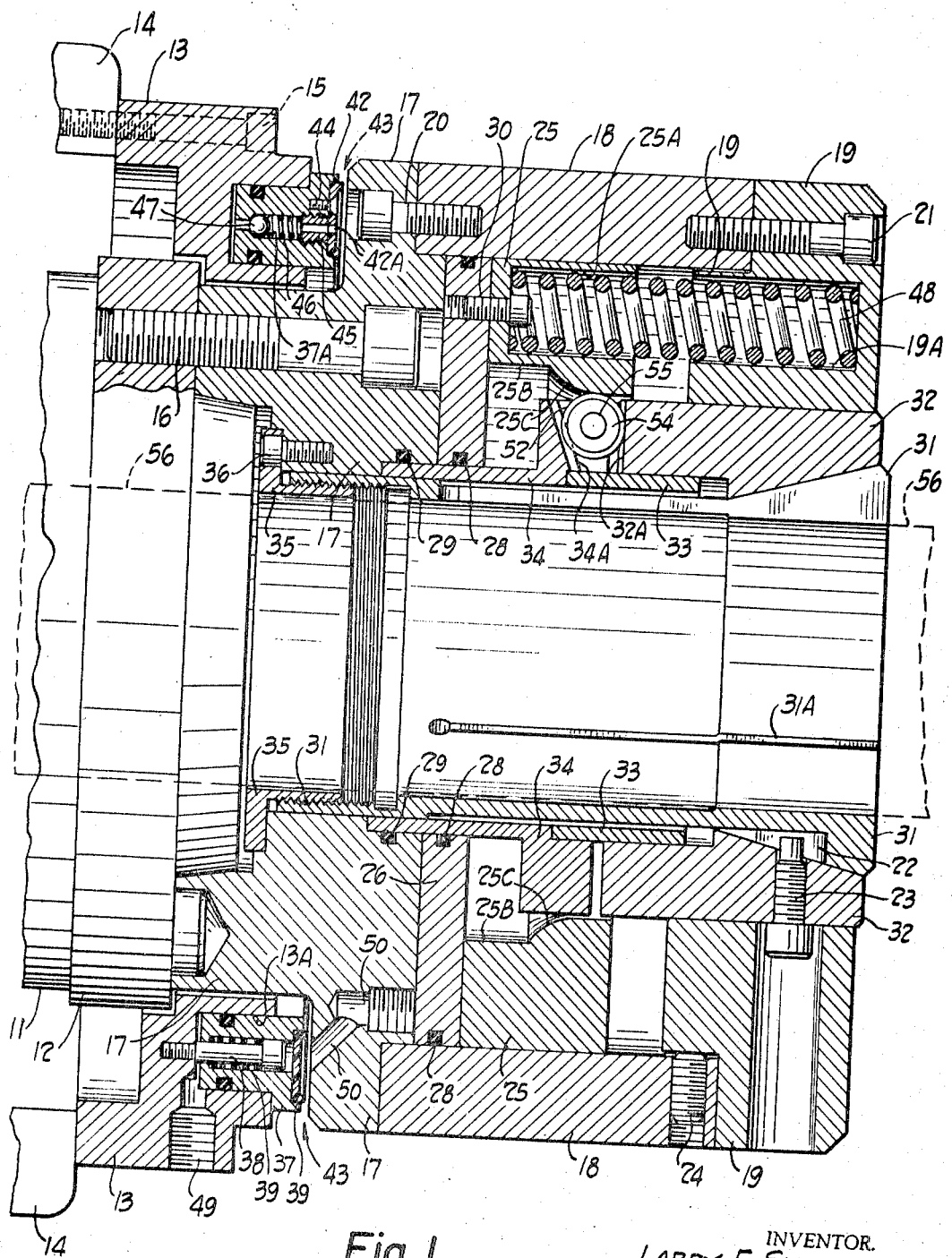
FIGURE 1 is a longitudinal sectional view taken axially through a preferred form of my collet mechanism, and showing the collet in its chucking or holding position.
Figure 2:
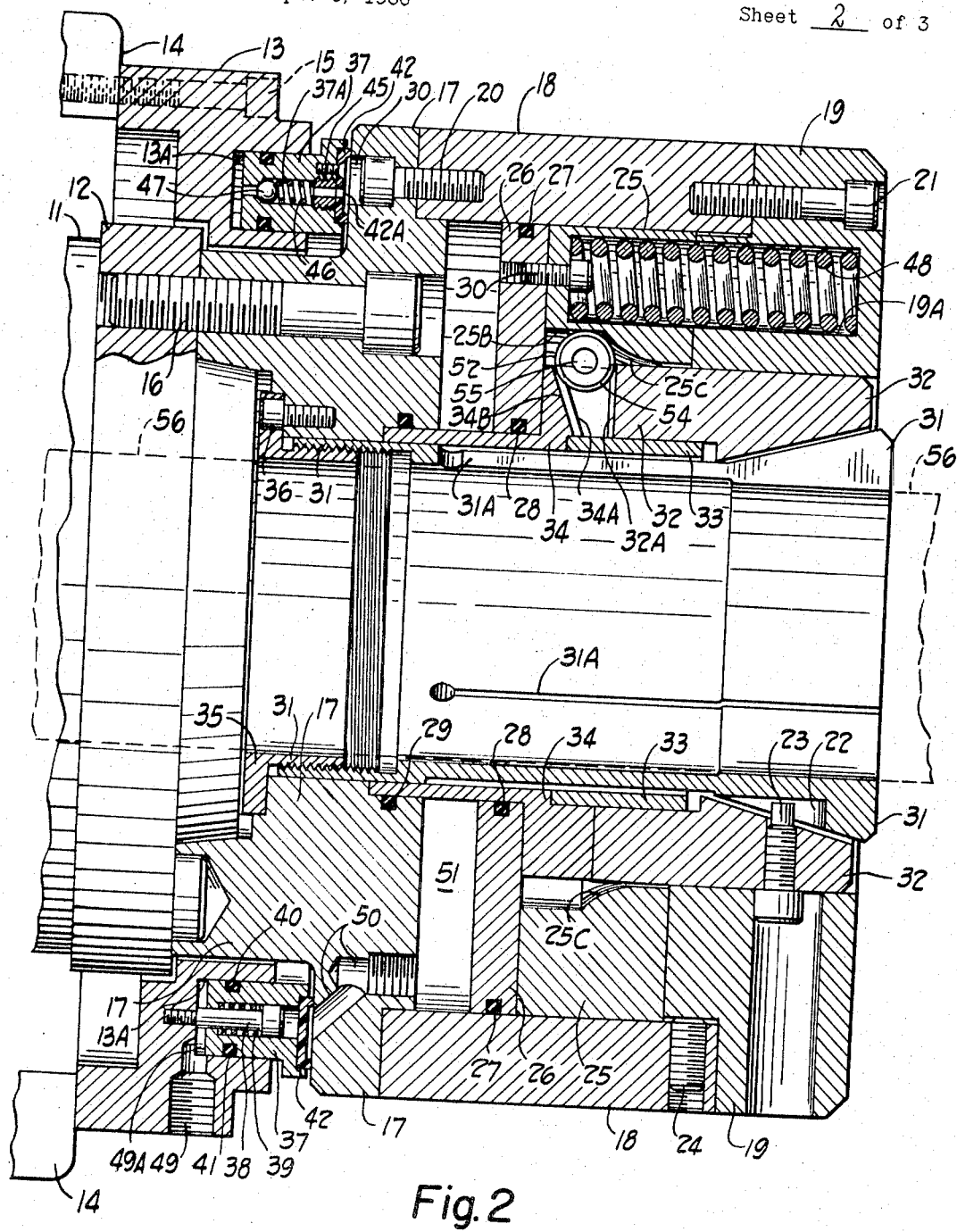
FIGURE 2 is a view similar to that of FIGURE 1 but shows the mechanism in position wherein the collet is in its released or nongrasping position.

In the present description which is directed to a preferred form of my collet mechanism, the right-hand end of the views of FIGURES 1 and 2 are referred to as the forward end and the left-hand end of the views are referred to as the rearward end. My collet mechanism has a shell member made up of an adapter ring 17, an outer cylinder 18 and a front plate 19. This shell member is secured by threaded bolts 16 to the flange 12 of the spindle 11 which rotates in a machine such as a lathe or screw machine. The mechanism also includes an annular gland housing 13 which is secured by four threaded bolts 15 to the end face 14 of a machine. As seen in FIGURES 1 and 2 the end face of the machine 14 and spindle 11 are shown broken away. Concentrically mounted within the shell member and spaced radially inward of the outer cylinder 18 is a collet-actuating sleeve 32. Concentrically mounted within the sleeve 32 is a collet 31 which has three fingers formed therein by the slots 31A equidistantly spaced around, the fingers being resilient as is usual for such collets. The collet 31 and the sleeve 32 adjacent their forward ends have cooperating camming surfaces so disposed that upon axial movement of the sleeve 32 in a forward direction of the collet 31 is actuated to compress the forward ends of the fingers and thus to move the collet to chucking or holding position against stock indicated in broken lines and denoted by the reference character 56. Upon movement of the sleeve 32 rearwardly, the resilient force of the fingers of collet 31 urge the sleeve 32 rearwardly. In FIGURE 1 the collet 31 is shown compressed radially inward upon the stock 56 whereas in FIGURE 2 the collet 31 is shown in its released position so as to loosen its hold on the stock 56.

The collet 31 has a key way or slot 22 formed therein and a key pin 23 carried by the sleeve 32 permits a relative axial movement between collet 31 and sleeve 32 but prevents rotation of the collet 31 relative to the sleeve 32. To aid in axially positioning the sleeve 32 within the front plate 19 there is provided four adjusting screws 24 equidistantly spaced therearound and which permits slight adjustment of the sleeve 32 relative to plate 19. Positioned axially within the shell member and in general axial alignment with the sleeve 32 is a ring member 34. The rearward end of the ring member 34 abuts against the adapter ring 17 and an O-ring 29 provides a seal between the adapter ring 17 and the ring member 34.

Positioned within the shell member is a piston made up of a toroidal piston 26 and a cam ring 25 bolted thereto by bolts 30, whereby the piston 26 and ring 25 move together in an axial direction.

The front plate 19 and cam ring 25 have axially aligned recesses formed therein, the ring member 25 being formed with fifteen recesses 25A and front plate 19 being provided with fifteen recesses 19A directly facing and aligned with the respective recesses 25A. Mounted within the aligned recesses 25A and 19A are coil springs 48 which are so biased as to resiliently urge a ring member 25 rearwardly and hence to urge the toroidal piston 26 rearwardly, that is toward its position shown in FIGURE 1. The springs 48, fifteen in number, are substantially equidistantly spaced around the circumferential extent of the shell member so as to distribute the resilient force thereof around the circumference of the mechanism.

Concentrically mounted within and extending between ring member 34 and sleeve 32 is an aligning sleeve 33. The rearward end of the aligning sleeve 33 abuts against the ring member 34 as illustrated. The sleeve 33 is secured to or otherwise held against the ring member 34 and hence the axial movement of the sleeve 32 is relative to the sleeve 33.

Within the shell member in advance of the adapter ring 17 and between the outer cylinder 18 and ring member 34 on one side of the piston 26 there is provided a chamber 51 adapted to receive fluid under pressure as for example compressed air. Around the maximum circumference of the piston 26 there is an O-ring 27 mounted in a groove provided for accommodating the same. Around the minimum circumferential surface of the piston 26 is an O-ring 28 in a groove provided for accommodating the same. The toroidal piston 26 moves forwardly and rearwardly between deposed walls of the cylinder 19 and the ring member 34. In FIGURE 1 the chamber 51 is at its minimum size and in FIGURE 2 the chamber 52 is at its maximum size.

Mounted within an annular groove 13A of the gland housing 13 is a gland member 37 of toroidal shape. The groove 13A faces forwardly and the gland member 37 is adapted to move forwardly and rearwardly within the groove 13A. Four bolts 38 secured to the gland housing 13 extend through four equidistantly spaced openings through the gland member 37. The heads of the bolts 38 make a sliding fit within the bores of the openings and thus the bolts 38 provide guides for the forward and rearward movement of the gland members 37 in the grooves 13A. Coil springs 39 around the shanks of respective bolts 38 are biased to urge the gland member 37 rearwardly, that is toward its position shown in FIGURE 1.

Secured to the forward face of the gland member 37 is an annular face seal 42, preferably made of Teflon or the like. The forward face of the seal 42 is somewhat concave as illustrated to provide two concentric lips extending therearound. In the forward position of the gland member 37 carrying the seal 42, the lips of the seal 42 sealingly engage the rearward face of the adapter ring 17 as shown in FIGURE 2. On rearward movement of the gland member 37 carrying the seal 42 the lips of the seal 42 are spaced from the rearward face of adapter ring 17 so as to leave an open space 43 therebetween, which open space 43 is open to atmosphere. The seal 42 is held to the forward face of the gland member 37 by eight equidistantly spaced screws 44. On diametrically opposite sides of the gland member 37 there are two openings extending therethrough in which ball check mechanisms are found. Each ball check mechanism comprises a ball 47 urged rearwardly against an internal seat by a small coil spring 46. The forward end of each coil spring 46 abuts against a threaded port member 45 threadably engaged in the gland member 37. There is a bore through the port member 45 and in alignment with the bore there is a hole 42A in the seal 42. Thus there are two passageways extending through the gland member from the rearward face thereof to the forward face and through the seal 42. The balls 47 are urged to initially resist movement of air or other fluid under pressure forwardly through the gland member but upon overcoming the resilient bias of the springs 46, air or other fluid under pressure may pass forwardly through the two bores so as to flow through the gland member and through the aligned openings 42A of the seal 42.

Extending radially of the gland housing 13 is an inlet 49 adapted to communicate with compressed air or other source of fluid under pressure. This inlet 49 communicates with an annular chamber 49A positioned rearwardly of the gland member 37 which in effect is a toroidal piston movable in a toroidal chamber. Formed in the adapter ring 17 is a conduit 50 which has an initial portion of annular shape on the rearward face of adapter ring 17 and so positioned as to communicate with the two openings 42A in the seal 42 on movement of the gland member 37 to its closed position as in FIGURE 1. This conduit 50 extends radially inwardly and forwardly through the adapter ring 17 so as to communicate with the chamber 51 at the rearward side of the piston 26.

Upon initial admission of compressed air or other fluid under pressure through the inlet 49 such fluid first pushes the gland member 37 forwardly in the groove 13A so as to press the seal 42 in a tight seal against the adapter ring 17. This is the position illustrated in FIGURE 2. Thereafter by a build up of pressure back of the gland member 37 the balls 47 are moved forwardly against the bias of the springs 46 to admit air or fluid through the two bores in the gland member and hence through the two openings 42A in the seal 42. This air or fluid under pressure is thus admitted to the chamber 51 and its force urges and moves the piston 26 forwardly from its position in FIGURE 1 to its position shown in FIGURE 2. A seal is provided between the gland member 37 and its confining bore in which it reciprocates by two O-rings 40 and 41.

The rearward end of the collet 31 is held in position by a threaded adapter 35 which is threadably engaged to complementary threads on the collet 31. The adapter 35 in turn is held in position by a bolt 36 secured to the adapter ring 17. The front plate 19 is secured to the outer cylinder 18 by eight bolts 21 and the outer cylinder 18 in turn is secured to the adapter ring 17 by eight bolts 20.

The rearward end face of sleeve 32 is provided with three equidistantly spaced notches 32B and on the inner end face of each notch 32B is an end surface 32A disposed in a plane substantially normal to the axis of the sleeve 32. It is noted that this end surface 32A is indented from the rearwardmost end of the sleeve 32. Each of these end surfaces 32A provides a wedging surface for a wedging action to be described.

The ring member 34 extends radially outward at its forwardmost portion to be in substantial alignment with the sleeve 32. The ring 34 at this rearwardmost portion is provided with three equidistantly spaced notches 34C. Each notch 34C is provided with a middle end surface 34B on each side of which are end surfaces 34A. In other words, each notch 34C has one end wall 34B and two walls 34A on opposite sides of the wall 34B. The wall 34B extends rearwardly more than do the two walls 34A as better seen in FIGURE 4. The walls 34A and 34B are disposed in planes which are inclined at an angle to the axis of the ring member 34 and extend forwardly and radially inward. It is thus seen that the opposed walls 32A and 34A converge as they extend radially inwardly. The walls 34A being inclined as shown provide wedging surfaces for a wedging action to be described.

Associated with each of the axially aligned notches 34C and 32B are roller devices. Each roller device is made up of a shaft 55 upon which is mounted a large middle roller 52 and two smaller or end rollers 53 and 54 on opposite sides of the large middle roller 52. Each of the rollers 52, 53 and 54 are independently revolvable around the shaft 55. Each roller device floats within the mechanism so as to be movable radially inward and outward between the opposed wedging surfaces described.

It is to be noted that the large middle roller rollingly engages the indented end surface 32A of its respective notch but does not engage the opposite surface 34B of the ring member 34. Thus as the large roller 52 rolls up and down on the surface 32A it does not have any engagement with the surface 34B. If it did engage the surface 34B it would be moving in an opposite direction at that surface and thus meet frictional resistance. However, by clearing the surface 34B the large roller 52 is free to rotate without such resistance.

It is also to be noted that the two end rollers 54 engage the surfaces 34A, respectively, but do not engage the end surface of the ring 32 thus the end rollers 53 and 54 may freely roll up and down the surface 34A without frictional resistance encountered with engagement of the sleeve 32. There is thus provided an efficient rolling action with a minimum of frictional resistance.

The ring 25 has a cylindrical inner surface 25B against which the roller device may move in its outermost position as in FIGURE 2. Extending forwardly and rearwardly inward from this cylindrical surface 25B is a camming surface 25C which slopes in a gradual curve as it moves radially inward and forwardly. The camming surface 25C extends circumferentially around the inner surface of the ring 25. As the piston 26 with the ring 25 secured thereto moves rearwardly under the force of the springs 48, the camming surface 25C rolls against and over the large middle roller 52 and thus forces the roller assembly radially downward between the opposed wedging surfaces described. There are three equidistantly spaced roller devices included and as all three are simultaneously moved radially inward between the opposed wedging surfaces described the sleeve 32 is forced forwardly relative to the collet 31 and thus actuates the collet 31 to its holding or chucking position against the stock 56. In FIGURE 1 the rollers are shown moved downwardly between the opposed wedging surfaces and held there by the camming surface 25C, which in turn is maintained in that position of FIGURE 1 by the resilient force of the springs 48. The camming and wedging action thus described provides a mechanical advantage means whereby the force exerted by the springs 48 is greatly increased and a greater force is imparted to the collet than would otherwise be obtainable by the spring alone.

When it is desired to release the collet so as to loosen its hold upon the stock 56 compressed air or other fluid under pressure is admitted to the inlet 49 which first moves the gland member 37 forwardly and subsequently is admitted through the holes 37A in the gland member 37 and holes 42A in the seal 42 into the conduit 50 and hence into the chamber 51. The force exerted by the compressed air or other fluid under pressure in the chamber 51 overcomes the resilient force of the springs 48 and moves the camming surface 25C from its rearward position in FIGURE 1 to its forward position in FIGURE 2. This permits the rollers to move radially outwardly from the wedging surfaces to the position shown in FIGURE 2. The resilient bias of the fingers of the collet 31 tends to urge the sleeve 32 rearwardly and this urges the roller assemblies radially outward to the position of FIGURE 2.

It is desired that before the gland member 37 is moved forwardly to cause sealing engagement of the seal 42 with the ring 17 that the spindle be stopped in order to avoid frictional wear of the seal 42.

When it is desired to release the compressed air or fluid under pressure from chambers 51 a valve (not shown) controlling the passage of compressed air or fluid to the inlet 49 is turned to exhaust the compressed air or fluid from the rearward face of the gland member 37. This causes the gland member 37 to move rearwardly from its position shown in FIGURE 2 to its position shown in FIGURE 1. This in turn permits the compressed air or fluid in the chamber 51 to escape through the conduit 50 and to atmosphere out through the space 43 between the seal 42 and rear face of ring 17.

The present disclosure includes that contained in the following claims as well as that in the foregoing description.

What is claimed is:

1. In apparatus having a rotatable part and a nonrotatable part concentrically disposed, the rotatable part carrying a piston and cylinder assembly for actuating by fluid pressure a mechanism carried by the rotatable part, said rotatable part having an annular face directed toward said nonrotatable part, and a conduit providing communication therethrough from said annular face to said cylinder of the piston and cylinder assembly, the improvement of valve mechanism for controlling the supply of fluid under pressure to and from said conduit, said valve mechanism comprising an annular gland member housing carried by said nonrotatable part, said gland member housing having an annular groove formed therein facing said annular face of the rotatable part, a toroidal piston positioned in said groove and movable therein toward and away from said face of the rotatable part, a sealing member carried by said toroidal piston in position to sealingly engage said face of the rotatable part upon movement of the toroidal piston against said face and to disengage said face upon movement of the toroidal piston away from said face, inlet means carried by the gland member housing for admitting fluid under pressure into said groove back of said toroidal piston to move the toroidal piston toward said face upon admission of fluid under pressure into said groove, said sealing member having a port and said toroidal piston having a passage extending therethrough for passage of fluid under pressure from said groove to said face by way of said port, and check-valve means mounted in said passage and resiliently biased to yieldably resist passage of fluid under pressure through the passage from said groove to said face, the resilient bias of the check valve means being such that upon fluid under pressure being initially admitted to said groove through said inlet means the toroidal piston is first moved toward said face to provide sealing engagement with said face and to provide communication between said passage and said conduit and such that after the sealing member makes such sealing engagement with said face the check-valve means is opened to permit the fluid under pressure to flow through said passage from the inlet means into the conduit and to the cylinder of said assembly, the release of fluid under pressure from said groove permitting the toroidal piston to move in said groove away from said face under the force of fluid under pressure in said conduit to permit the fluid under pressure to be released from said conduit and out between the sealing member and said face.

2. Valve mechanism as claimed in claim 1 and in which said sealing member has concentric spaced lips directed toward said face to make sealing engagement therewith by said lips, and in which said conduit includes an annular passageway positioned to communicate with said passage upon the lips of the sealing member being in sealing engagement with said face.

3. Valve mechanism as claimed in claim 2 and in which said sealing member is of a resiliently yieldable material of the order of vulcanized rubber, nylon and Teflon, and in which said check-valve means includes a ball and a spring positioned in said passage.

4. Valve mechanism as claimed in claim 1 and in which said fluid under pressure is compressed air, and including concentric O-rings mounted on said toroidal piston to provide a sliding seal between the toroidal piston and the annular side walls of the said groove.

References Cited

UNITED STATES PATENTS 2,675,678 4/1954 English _____ 91—189 X
3,176,553 4/1965 Schubert _____ 279—4 X
3,364,823 1/1968 Benjamin et al. ____ 279—4 X CARROLL B. DORITY, Jr., *Primary Examiner.*

U.S. Cl. X.R.
91—468; 279—4